(12) United States Patent
Green et al.

(10) Patent No.: US 10,677,726 B2
(45) Date of Patent: Jun. 9, 2020

(54) TUNABLE DIODE LASER ABSORPTION SPECTROSCOPY WITH CORRECTED LASER RAMPING NONLINEARITIES

(71) Applicant: INTERNATIONAL BUSINESS MACHINES CORPORATION, Armonk, NY (US)

(72) Inventors: William Green, Yorktown Heights, NY (US); Chu Cheyenne Teng, Yorktown Heights, NY (US); Gerard Wysocki, Yorktown Heights, NY (US); Chi Xiong, Yorktown Heights, NY (US); Eric Zhang, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 34 days.

(21) Appl. No.: 15/846,912

(22) Filed: Dec. 19, 2017

(65) Prior Publication Data

US 2019/0187051 A1   Jun. 20, 2019

(51) Int. Cl.
*G01N 21/45* (2006.01)
*G01J 3/45* (2006.01)
*G01N 21/27* (2006.01)
*G01N 21/39* (2006.01)

(52) U.S. Cl.
CPC ............ *G01N 21/45* (2013.01); *G01J 3/45* (2013.01); *G01N 21/274* (2013.01); *G01N 21/39* (2013.01); *G01N 2021/399* (2013.01)

(58) Field of Classification Search
CPC .................................. G01N 21/45; G01J 3/45
See application file for complete search history.

(56) References Cited

U.S. PATENT DOCUMENTS

| 6,421,120 B1 * | 7/2002 | Wildnauer | G01J 3/28 356/243.1 |
| 2004/0245470 A1 * | 12/2004 | Nadezhdinskii | G01N 21/39 250/343 |

\* cited by examiner

*Primary Examiner* — Hwa Andrew Lee
(74) *Attorney, Agent, or Firm* — F. Chau & Associates, LLC

(57) ABSTRACT

A tunable diode laser absorption spectroscopy device includes a tunable diode laser. A laser driver is configured to drive the diode laser and ramp it within a particular frequency range. An analyte gas container, a reference gas container, and a fringe generating device are configured to receive the laser therethrough. An optical detector is configured to detect the laser after it has passed through the analyte gas container and/or the reference gas container, and the in-line fringe generating device. An acquisition card is configured to sample an output of the optical detector. A spectral analyzer is configured to receive output data from the acquisition card, determine a spectrum of the output data, decouple the fringe spectrum from the measured spectrum, calibrate the spectrum based on an expected ideal spectrum of both the fringe and reference gas, and determine a composition of the analyte based on the calibrated spectrum.

17 Claims, 6 Drawing Sheets

TUNABLE DIODE LASER ABSORPTION SPECTROSCOPY WITH CORRECTED LASER RAMPING NONLINEARITIES

GOVERNMENT LICENSE RIGHTS

This invention was made with government support under DE-AR0000540 awarded by the Department of Energy. The government has certain rights in the invention.

BACKGROUND

The present invention relates to laser absorption spectroscopy and, more specifically, to correcting laser ramping nonlinearities using an in-line frequency calibration reference for tunable diode laser absorption spectroscopy.

Laser absorption spectroscopy (LAS) may be used to determine an atomic and/or molecular composition of matter by analyzing the frequency properties of laser light passing through an analyte. One popular form of LAS is tunable diode laser absorption spectroscopy (TDLAS). Here, the molecular composition and concentration, as well as other important properties of a gaseous mixture are quantified using a diode laser whose output frequency is systematically changed ("tuned") within a particular frequency range of interest, where such a range covers a single analyte absorption transition, or a set of analyte absorption transitions in the case where multiple analytes are under investigation.

However, in TDLAS, laser ramping nonlinearities may impact line-shape retrieval and may reduce the efficacy of background removal algorithms.

SUMMARY

A tunable diode laser absorption spectroscopy (TDLAS) device includes a tunable diode laser configured to produce a laser beam. A laser driver is configured to drive the tunable diode laser and ramp the laser beam within a particular frequency range of interest. An analyte gas container includes an analyte gas and is configured to receive the laser beam therethrough. A reference gas container includes a reference gas and is configured to receive the laser beam therethrough. An optical component exhibiting a periodic spectral characteristic (i.e. a 'fringe' spectrum) is inserted in an in-line configuration to receive the laser beam therethrough. The optical component generating a periodic fringe spectrum will hereby be referred to as a fringe generating device. At least one optical detector is configured to detect the laser beam after it has passed through the analyte gas container, the reference gas container, or both the analyte and reference gas container, followed by the fringe generating device. An acquisition card is configured to digitally sample an output of the optical detector. A spectral analyzer, consisting of a computational device, computer system, processing unit or some variant thereof is configured to receive output data from the acquisition card, measure a spectrum of the output data, decouple the fringe spectrum from the measured spectrum, calibrate the measured spectrum based on the reference gas spectrum and an expected ideal uniformly periodic fringe spectrum and determine a composition of the analyte based on the calibrated measured spectrum. The calibration (wavelength linearization) method may optionally be used within a closed feedback loop to adaptively configure the laser driver such that nonlinearities in laser ramping are directly compensated in real-time.

A method for performing tunable diode laser absorption spectroscopy, includes driving a tunable diode laser with an initial driving signal having soft transitions between discontinuous ramp segments to produce a laser beam. The laser beam is passed through a reference gas, an analyte gas, and a fringe generating device, either in a parallel or series configuration, or some combination thereof. The fringe generating device may consist of an optical Fabry-Perot interferometric (FPI) etalon, a Mach-Zehnder interferometer (MZI), or any other optical device that produces a uniform and periodically varying intensity as a function of laser wavelength. The laser beam is detected after it has passed through the reference gas, the analyte gas, and the fringe generating device using an optical detector to produce a detection signal. The contribution of the fringe generating device is de-coupled from the detection signal. The detection signal is calibrated using a contribution of both the decoupled reference gas spectrum and the fringe spectrum. The calibrated detection signal is interpreted to accurately quantify a composition of the analyte gas.

BRIEF DESCRIPTION OF THE SEVERAL VIEWS OF THE DRAWINGS

A more complete appreciation of the present invention and many of the attendant aspects thereof will be readily obtained as the same becomes better understood by reference to the following detailed description when considered in connection with the accompanying drawings, wherein.

DETAILED DESCRIPTION

Figure 1:
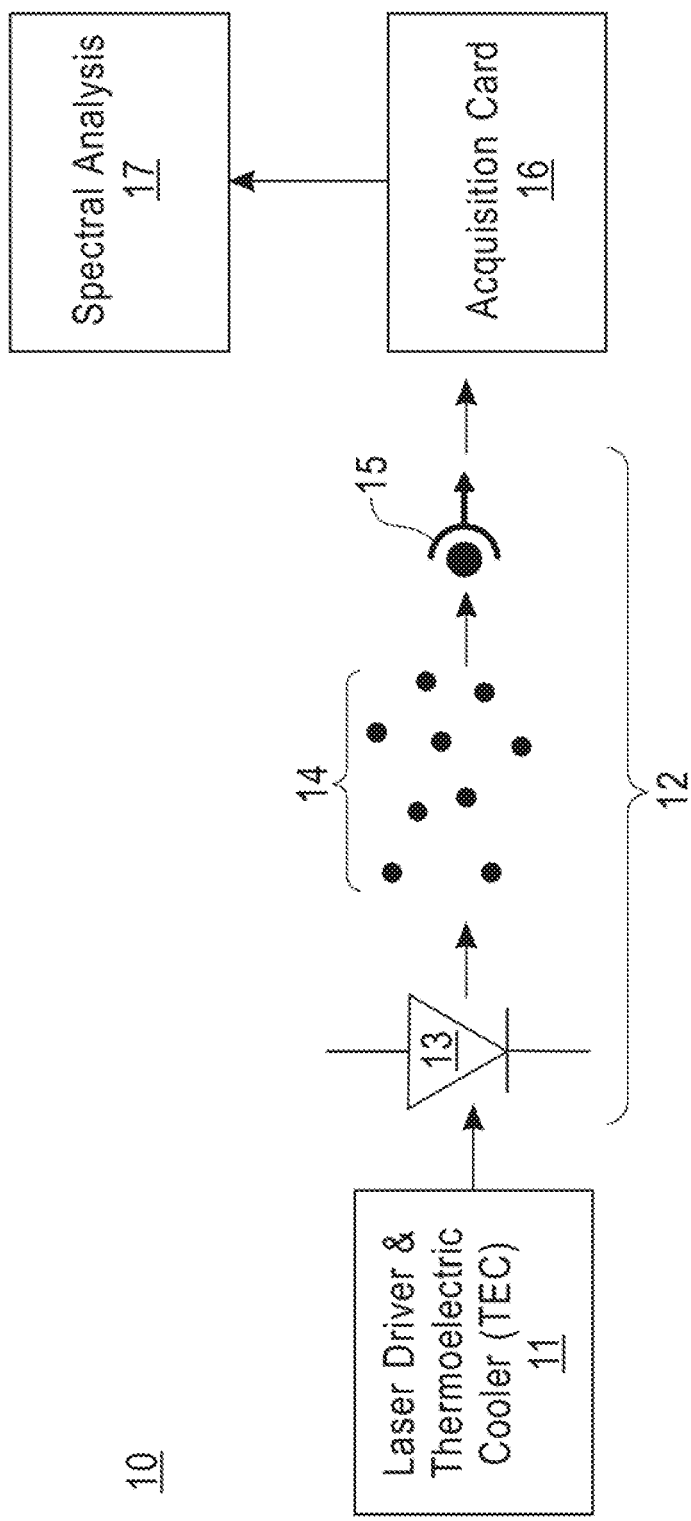
FIG. 1 is a high-level physical schematic illustrating a laser absorption spectroscopy scheme in accordance with exemplary embodiments of the present invention.

In describing exemplary embodiments of the present invention illustrated in the drawings, specific terminology is employed for sake of clarity. However, the present invention is not intended to be limited to the illustrations or any specific terminology, and it is to be understood that each element includes all equivalents.

Exemplary embodiments of the present invention relate to systems and methods for performing tunable diode laser absorption spectroscopy (TDLAS) in such a way as to correct for laser ramping nonlinearities using an in-line frequency calibration reference. The in-line aspect of the frequency calibration reference herein disclosed, also termed a "fringe generating device," is the central feature that eliminates the need for an extraneous wavelength calibration channel thereby substantially reducing acquisition sampling bandwidth and the need for dedicated optical detection components.

FIG. 1 is a generalized diagram illustrating a system 10 for performing TDLAS in accordance with exemplary embodiments of the present invention. TDLAS may be performed by driving a tunable diode laser 13 using a laser driver and a thermoelectric cooler (TEC) 11. An optical system 12 may include the tunable diode laser 13 as well as the analyte 14 and an optical detection element 15. The analyte 14 may be a gaseous mixture of unknown composition and may be enclosed within a sample container constructed of an optically transparent material at the utilized laser wavelength, including, but not limited to materials such as: fused silica, quartz, calcium fluoride, silver chloride, and silicon. Other optical devices such as mirrors and lenses comprising, but not limited to the previously mentioned materials may be present as well. The optical detection element 15 may be a laser diode detector comprised of materials responsive to the utilized laser wavelength. The output of the optical detection element 15 may be sent to an acquisition card 16 (typically a signal digitizer) to sample the photodiode output over the output range of the laser ramp, which corresponds to the particular frequency (or wavelength) range of interest around the target transition line-shape. Analysis of the resulting digitized spectrum is performed via a least-mean squares (LMS) nonlinear regression algorithm 17 utilizing an appropriately selected spectral line-shape, with such examples including (but not limited to): Lorentzian, Voigt, Gaussian, Rautian, or Galatry profiles. The resulting analyte concentration is among the free-parameters incorporated into the LMS fitting routine, and will be used to determine the quantitative composition. The remaining free parameters resulting from the LMS regression model may be used to also determined other key line-shape properties of the analyte of interest, in addition to ambient conditions (including, but not limited to pressure, temperature, etc.) under which the analyte is measured. The optical system 12 may additionally include any number of intervening elements such as mirrors, lenses, beam splitters, waveguides, etc., as elaborated in an exemplary embodiment shown in FIG. 3.

As discussed above, in performing TDLAS, in which a tunable diode laser is used to generate laser light while the frequency of the laser light is tuned over a desired range, nonlinearities of the output laser light output may occur as a result of finite thermal and/or carrier response times, or laser hysteresis, which provide nonlinear and non-uniform response particularly with respect to any high-frequency ramp contributions (e.g. particularly those occurring when the ramp transitions to the start of the subsequent ramp. These nonlinearities may make it difficult to accurately interpret the analyte by distorting the acquired line-shape profile and/or reducing the efficacy of background removal algorithms.

Background removal is the process by which noise and other artifacts are removed from the signal measured by the optical detection element 15 output so that the signals being sampled by the data acquisition card and digitizer 16 may be relatively free from background influences and so the resulting spectral. LMS analyzer model 17 may be used to accurately quantify the analyte. Conventionally, a background subtraction or ratio is utilized for mitigation of unwanted and/or unintended artefacts in the measured spectrum, but the nonlinear and/or non-uniform laser ramp results in a background spectral distortion that is not reliably accommodated via such conventional background removal techniques.

In addition to removing background influences, exemplary embodiments of the present invention may calibrate the measured signal from the optical detection element 15, for example, by measuring the actual nonlinear and/or non-uniform output of the optical detection element 15 with respect to an ideal linear and uniform output of the optical system. The actual nonlinear and/or non-uniform output of the optical system may be determined using a fringe generating device which in an ideal case exhibits a uniform and periodically varying spectrum, which is termed a "fringe spectrum," or simply a "fringe." Such a fringe spectrum may be generating using a Fabry-Pérot interferometer (FPI), an unbalanced Mach Zehnder interferometer (MZI), or similarly equivalent variants of these structures thereof. In the case of the former, an Fabry-Perot structure is one in which the laser light is partially reflected between two reflective surfaces intermediate between the laser source and optical detector, such that particular frequencies of light may resonate therein and project therefrom. In the latter case of a Mach-Zehnder interferometer (MZI), an optical beam is split (symmetrically or asymmetrically) into two beams, which travel different lengths (i.e. unbalanced lengths) prior to recombination at an output optical coupler. In this case, the MZI output exhibits periodic and uniform fringe features due to interference of the beam pair upon traversing different lengths, and therefore experiencing different phase variations. Although the FPI and unbalanced MZI represent two common implementations of fringe generating devices, the method herein disclosed is generally applicable to all fringe generating devices which exhibit a periodic and uniform spectrum and is not limited to the specific embodiments described in what follows. Because the resonance frequency of the fringe spectrum may be accurately determined by the physical path length of the FPI, or correspondingly the path length difference of the MZI, the output of the optical sensor 15 may be calibrated against the expected resonance frequency spacing of the fringe spectrum, thereby providing a means for wavelength linearization (i.e. correcting wavelength nonlinearities and/or non-uniformity of the laser ramp) of the spectrum measured by optical detection element 15.

Additionally, wavelength calibration may utilize a reference gas, which is a sample of a gas of known composition. By analyzing the optical detection element 15 output for the reference gas and correlating this output with the expected results for the reference gas, the system 10 may be further wavelength calibrated, and the absolute wavelength of the laser determined by targeting a documented line-shape transition.

According to exemplary embodiments of the present invention, in-line calibration may be performed using an existing acquisition channel, without the need to introduce a new acquisition channel with an associated detector and signal digitizer. Such an in-line arrangement preserves the existing TDLAS infrastructure, such that the method described herein may be generally utilized in any existing TDLAS, or indeed, LAS system. The in-line arrangement may make use of an artificially introduced Fabry-Pérot interferometer (FPI) or Mach-Zehnder Interferometer (MZI) with spectral frequency components decoupled from the spectral line-shape profile to avoid cross-talk (which limits the accuracy of concentration retrieval), or may be performed using existing fringe features intrinsic to the TDLAS measurement system. A particularly pertinent example of the latter includes distributed reflections from line-edge roughness intrinsic to on-chip optical waveguides, which occur in a frequency scale high enough to be decoupled from the line-shape profile, and is thus useful for wavelength calibration. The calibration procedure may utilize a simple fringe peak search routine to determine the fringe spacing, or a chirped sinusoidal regression model, or any other method thereof which yields a transformation of the raw measured spectrum into its linear counterpart. This transformation may then be applied to the measured spectrum to linearize and calibrate the line-shape transition prior to retrieval of the analyte concentration.

Significantly, the utilization of an in-line fringe generating device (acting as a frequency calibration device) eliminates the need for an additional acquisition channel for optical frequency calibration, by utilizing already existing channels in any given TDLAS system. Such an in-line arrangement is expected to improve TDLAS system performance by avoiding the need for laser power and measurement bandwidth redistribution to a separate channel, and also eliminates the added cost imposed by a dedicated optical detection element in an additional channel.

A key feature of any in-line calibration method utilizing a fringe generating device is that the frequency contributions of the fringe generating device occurs in a range that is dissimilar to the spectral line-shape under consideration. Given the inverse relationship between the fringe periodicity in frequency (or spectral) domain and the physical length of the corresponding fringe generating device (FPI physical path length or MZI differential beam path length), it is merely sufficient to select an FPI (or MZI) with a physical length (or differential beam path length) sufficiently long to avoid spectral cross-talk (i.e. decoupling the FPI spectrum from the line-shape profile in frequency domain), and still retain the wavelength calibration benefits of the FPI or MZI. The mitigation of spectral cross-talk by selecting appropriate dimensions of the fringe generating device is essential to the usefulness of such an in-line configuration for wavelength calibration, as any residual spectral cross-talk between the fringe and absorption feature of interest will result in undesirable artefacts during the concentration retrieval process. The de-coupling procedure may be accomplished via frequency decomposition to determine the extent to which the fringe spectrum and line-shape spectrum overlap in frequency domain (i.e. spectral cross-talk). Such decomposition methods may include, but are not limited to Fourier decomposition, Airy decomposition, or other methods thereof. As a general guide, it is qualitatively accurate to simply select fringe generating device dimensions (FPI length or MZI differential length) such that multiple fringe periods occur within the line-shape full-width half-maximum (FWHM). For example, in the case of the R(4) spectral transition of methane at 1650.96 nm, the full-width at half-maximum (FWHM) is 0.15 cm$^{-1}$, and an FPI of effective physical length (the product of group index and true physical length) of ~30 cm (calculated using an air-gap FPI) may be sufficiently used in this configuration so as to provide ~10 fringes within the R(4) FWHM, and thus easily decouple the fringe frequency and reduce crosstalk between the analyte signal and that of the fringe spectrum. Analogously, this may be satisfied using an MZI of path differential ~30 cm, which is particularly simple to accommodate using a fiber path difference between the MZI arms. This length is significantly reduced in cases where non-air gap FPIs or MZIs are utilized, such as that created using materials with high refractive index. FPIs or MZIs with long effective length are therefore easily attainable on a waveguide or in-line fiber path, which may be inserted with negligible increase in the physical size of the TDLAS sensor.

Accordingly, in performing TDLAS, various different arrangements of optical systems using an in-line FPI may be used so as to test the analyte in a well-calibrated manner.

Figure 2:
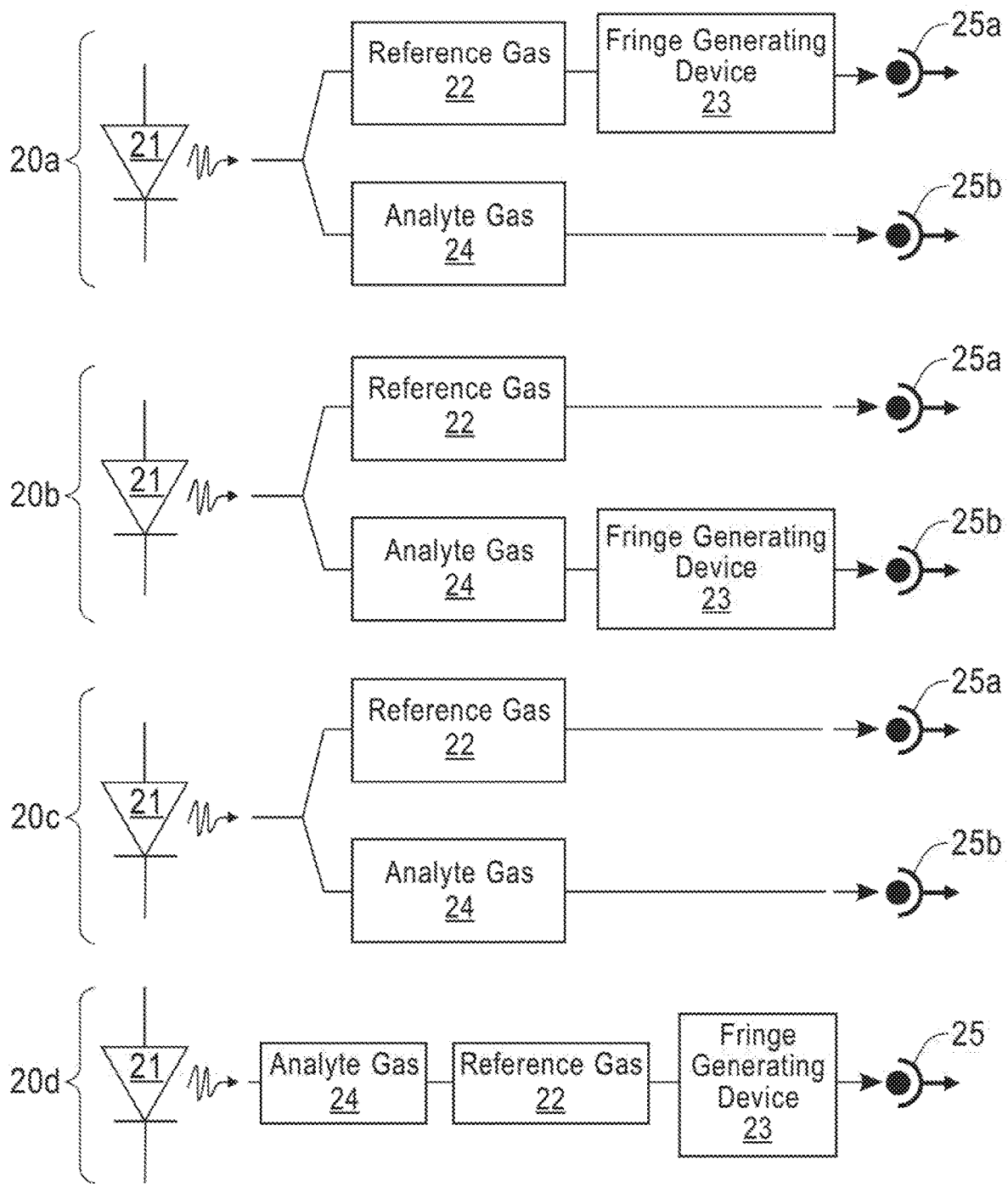
FIG. 2 is a schematic diagram illustrating four exemplary embodiments of in-line fringe generating device placement for calibration of laser ramp nonlinearities in accordance with exemplary embodiments of the present invention.

FIG. 2 is a schematic diagram illustrating various optical system arrangements for performing TDLAS in accordance with exemplary embodiments of the present invention. In this figure, four different arrangements are illustrated. According to the first arrangement 20a, two acquisition channels are used. Laser output from the tunable diode laser 21 is split along two different acquisition channels. In the first acquisition channel, the laser light is directed through a reference gas 22 and an in-line fringe generating device 23, along with their corresponding optical elements. The output is then picked up by a first optical detection element 25a. This first acquisition channel may accordingly be used to calibrate the spectral LMS analysis based on the measured frequency response of the fringe generating device 23 after its decoupling from the reference gas 22. The laser ramping background may also be characterized based on this first acquisition channel such that it may be removed from the second acquisition channel.

In the second acquisition channel, the laser light is directed through the analyte gas 24 and the output is then picked up by a second optical detection element 25b. The LMS analysis, having been wavelength and background calibrated according to the readings from the first acquisition (reference) channel, may then be interpreted in a manner that accounts for background and laser ramping nonlinearities and/or non-uniformities.

According to a second arrangement 20b, two acquisition channels are again used. However here, the reference gas 22 may be disposed within the first acquisition channel while the analyte gas 24 and the fringe generating device 23 may be disposed within the second acquisition channel. The first acquisition channel, as detected by the first optical detector 25a, may be used to determine the anticipated line-shape profile for LMS analysis. As the frequency response of the fringe generating device 23 may be known from its physical path length, the second acquisition channel, as detected by the second optical detector 25b, may be fringe-corrected (i.e. wavelength calibrated). A key feature of such an inserted fringe generating device (FPI, MZI or any similarly equivalent manifestation thereof) involves the previously described decoupling of frequency contributions; for example, any inserted FPI should be physically long enough to introduce sufficient density of fringe features so as to avoid appearing similar (i.e. spectral cross-talk) to the spectral line-shape under consideration.

According to a third arrangement 20c, two acquisition channels are again used. However here, the reference gas 22 may be disposed within the first acquisition channel while the analyte gas 24 may be disposed within the second acquisition channel. According to this configuration, a fringe generating device 23 device may be omitted, provided the first acquisition channel (reference path) or second acquisition channel (analyte path) contains intrinsic fringe spectral features with frequency contributions decoupled from the transition line-shape. This arrangement is particularly pertinent in cases where an on-chip TDLAS device is used; the on-chip TDLAS waveguide sensor may exhibit intrinsic fringe structures due to on chip FPIs, as opposed to the artificially inserted fringe generating devices described elsewhere within this disclosure. These intrinsic FPIs (or similarly equivalent fringe generating mechanisms) may be created as a result of line-edge roughness within the on-chip waveguides, however, other forms of intrinsic fringes based on partially reflecting surfaces between the laser source and optical detector may be present within the system and used in this manner. Again, a key feature that the fringe frequency contributions are highly dissimilar to the spectral line-shape under consideration. In this way, calibration and background removal may be performed without the use of an artificially inserted fringe generating devices by using the fringes inherent in the system.

The first acquisition channel, as detected by the first optical detector 25a, may be used to calibrate the LMS analysis via decoupling of the fringe spectrum from the reference gas spectrum, correction of wavelength linearity and/or non-uniformity, followed by analysis of the corrected reference spectrum. The second acquisition channel, as detected by the second optical detector 25b, may be used to identify and quantify the analyte gas. Depending on the nature of the fringes in the reference and acquisition channels, this scenario may be reversed. In such a reverse case, fringes present in the second acquisition channel measured by optical detector 25b may be used to calibrate the LMS analysis prior to analysis of the reference spectrum measured in 25a. In turn, the resulting corrected ramp, along with the corrected reference spectrum may be used to accurately quantify the analyte gas measured by optical detector 25b.

Exemplary embodiments of the present invention may also provide an in-situ real-time optical frequency calibration scheme that does not require more than one acquisition channel. For example, according to a fourth arrangement 20d, the tunable diode laser 21 may provide laser light through the analyte gas 24, through the reference gas 22, and through the fringe generating device 23, to be detected by a single optical detector 25, as part of a single acquisition channel. Such an exemplary embodiment is ideal under measurement scenarios which are practically limited by the sample rate of signal digitization, wherein the acquisition bandwidth may be maximally utilized to avoid sharing bandwidth across multiple channels. This exemplary embodiment is also ideal in scenarios which are practically limited by optical power, wherein the optical throughput may be maximally utilized by avoiding power redistribution across multiple measurement channels. The order in which these elements are arranged may be as shown, or may be alternatively arranged. Thus, according to this configuration, the fringe generating device is inserted in-line to provide optical frequency referencing.

According to this configuration, the fringes will appear within the detected spectrum itself and the frequencies of the in-line fringe generating device may then be de-coupled from the detected spectrum using an FPI or MZI or similarly equivalent manifestation thereof, such that multiple fringes appear within the spectral line-shape.

Figure 3:
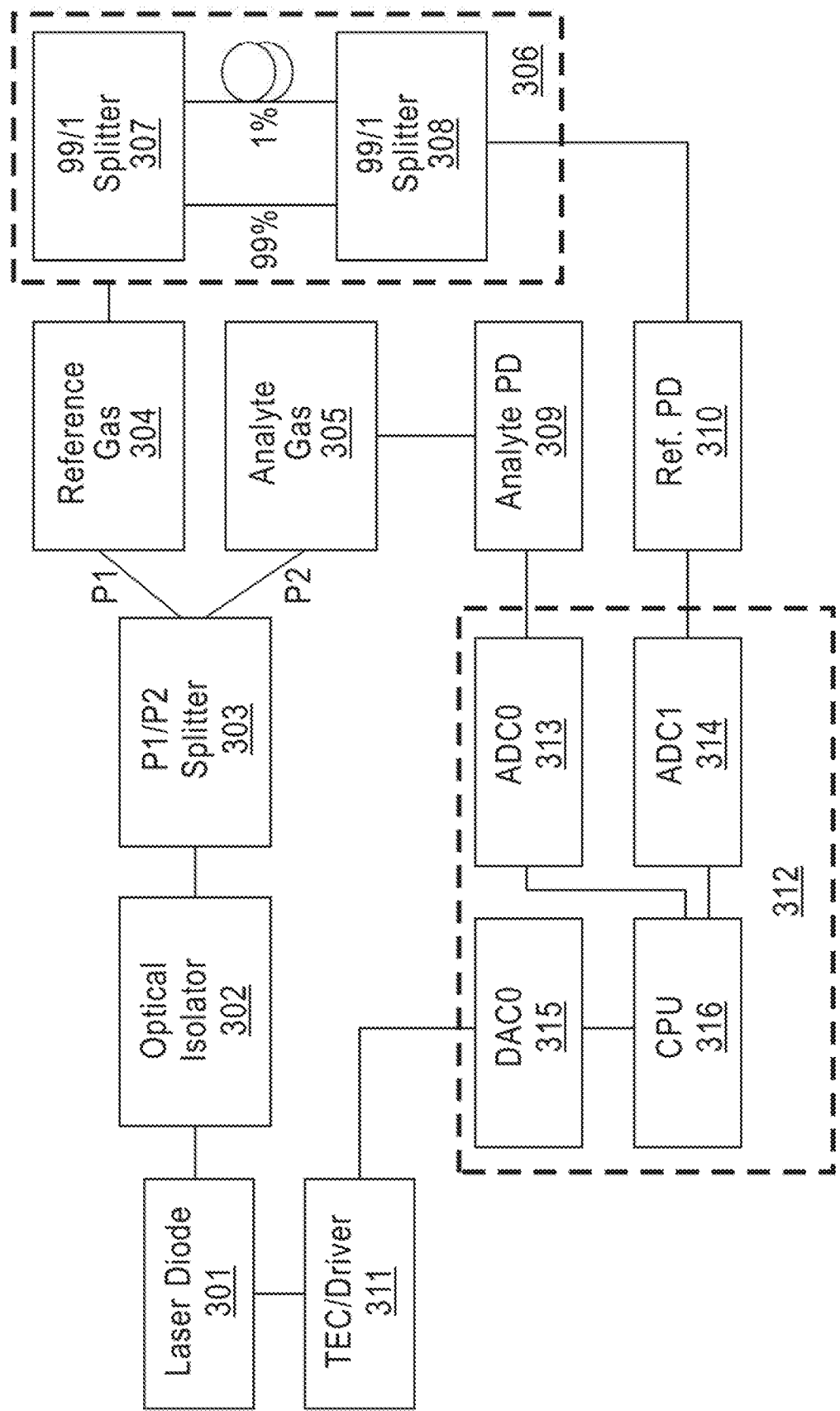
FIG. 3 is a detailed functional block diagram illustrating an exemplary embodiment expanded from element 20a of FIG. 2.

FIG. 3 is a schematic diagram illustrating a configuration of a TDLAS system in accordance with exemplary embodiment 20a of the present invention. This configuration is illustrated and described with an increased level of detail and it is to be understood that these added details maybe shared with any of the above-described configurations.

According to the arrangement illustrated in FIG. 3, a tunable laser diode 301 may be driven by a driver and/or a temperature controller such as a thermoelectric cooler (TEC). The laser diode 301 may provide a laser beam to an optical isolator 302, which may permit light to travel therethrough in only one direction and thereby prevent unwanted optical feedback. The laser beam is thereafter directed to a beam splitter 303, e.g. a 50/50 beam splitter producing two beams of substantially equal amplitude, although other output combinations may be utilized without substantially affecting the efficacy of this method. The beam splitter 303 may divide the laser beam along a P1 route and a P2 route. The P1 route may then direct the laser beam through a reference gas 304 while the P2 route may then direct the laser beam through an analyte gas 305.

Along the P1 route, the beam may enter an in-line fringe generating device 306, which is detailed here using an exemplary embodiment of an interferometric fiber-optic Mach-Zehnder interferometer, but which may be replaced by any other fringe generating manifestation suitable for the TDLAS or LAS system. The in-line fiber-optic MZI 306 detailed in this exemplary embodiment includes a first beam splitter 307 (e.g. a 99/1 beam splitter) and a second beam splitter 308 (e.g. also a 99/1 beam splitter). The beam may be split into a major component (e.g. with 99% of the total amplitude) and a minor component (e.g. with 1% of the total amplitude). The major component may be directed between the first beam splitter 307 and the second beam splitter 308, directly, while the minor component may be directed between the first beam splitter 297 and the second beam splitter 308 via a fiber with different path length from the major component. As the light travels through the variable fiber length (resulting in unbalanced phase between the two arms), the light undergoes interference at the output splitter 308 and creates an interference pattern that is dependent upon the laser wavelength, and is inversely proportional to the physical path length difference between the major and minor components.

As the light exits the MZI 306, along the P1 path, it is detected by a reference photodetector 310 and then the resultant signal is digitized by an analog-to-digital converter (signal digitizer) 314 disposed within a data acquisition (DAQ)/processing unit 312.

As the light exits the analyte gas 305, along the P2 path, it is detected by an analyte photodetector 309 and then the resultant signal is digitized by an analog-to-digital converter 313 disposed within the DAQ/processing unit 312.

The output of each analog-to-digital converter 313 and 314 is provided to a processor 316 for TDLAS LMS regression analysis. In FIG. 3, the TEC and/or laser driver is controlled by the CPU 316, which provides an analog signal (via the digital-to-analog converter 315) to be used to ramp the laser, and where compensated ramp nonlinearity feedback may be provided based on the analyzed nonlinearity acquired in Ref. PD 310 and digitized by ADC1 314.

During the aforementioned TDLAS analysis, the contribution of the fringe generating device may be de-coupled and the system may be calibrated in real-time by determination of a transformation that linearizes the spectral output of the reference gas of the P1 path, and applying the identical linearization transformation to the analyte's spectral line-shape as determined by the measured output of the P2 path. Following this linearization transformation of the measured output from the P2 path, the resulting wavelength calibrated spectrum may then be used for accurate concentration retrieval of the analyte.

Accordingly, the configuration illustrated within FIG. 3 may be substantially the same as the configuration illustrated within FIG. 2 as the first arrangement 20a. However, it is to be understood that this additional detail may be applied to any of the arrangements a-d of FIG. 2, as well as to modifications thereof.

Figure 4:
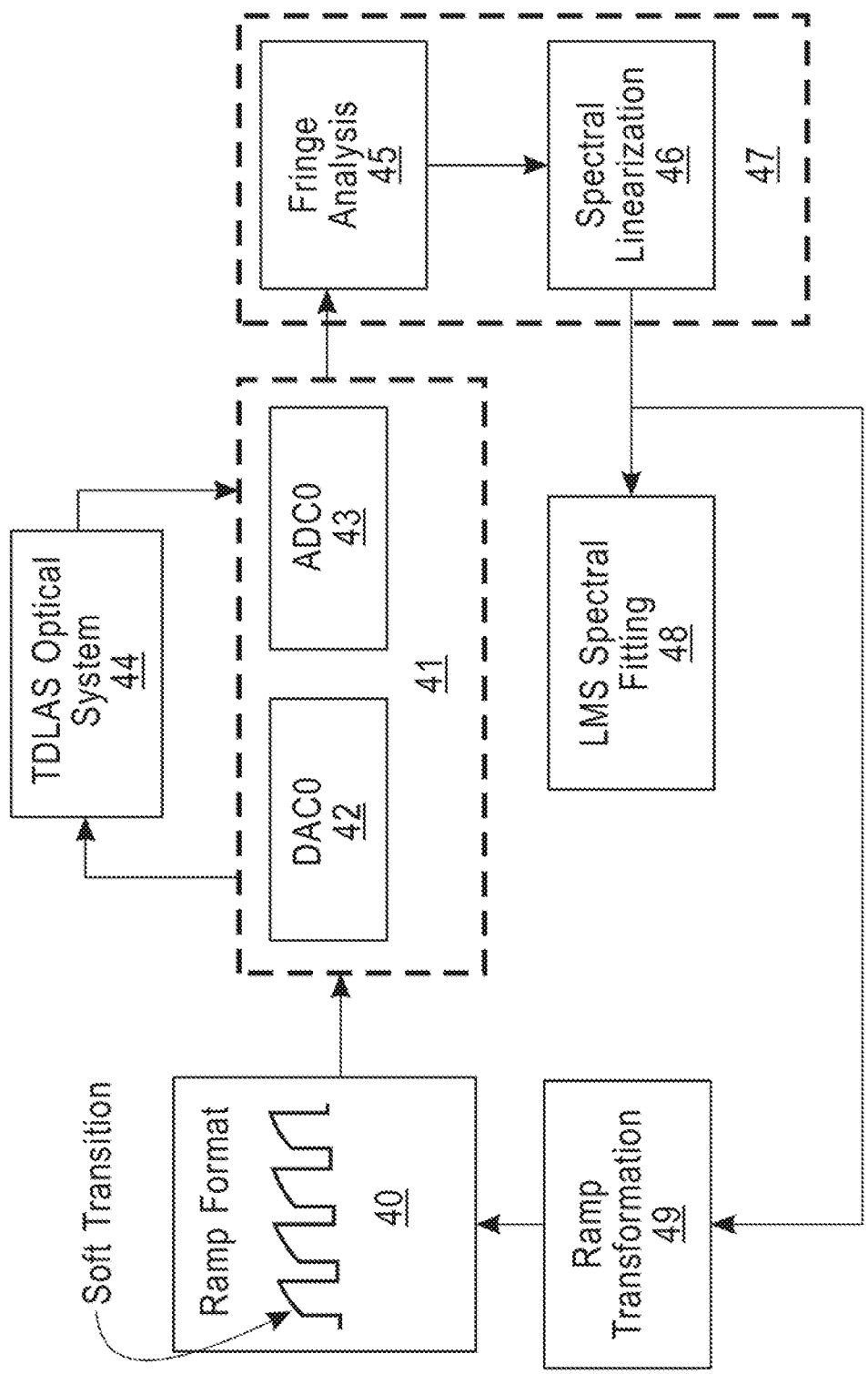
FIG. 4 is a schematic diagram illustrating a system for performing general frequency calibration acquisition steps in accordance with exemplary embodiments of the present invention.

FIG. 4 is a schematic diagram illustrating a system for performing general frequency calibration acquisition steps in accordance with exemplary embodiments of the present invention. The ramp signal generator 40 may provide a driving signal having a soft ramp transformation (e.g. a "soft transition"). The soft ramp transformation may be used to mitigate some nonlinearities of the laser ramping, particularly those occurring in the initial phase of the ramp and/or between adjacent ramp segments where discontinuities may occur. The digitized driving signal may be provided to a DAQ card 41 that may include a digital-to-analog converter 42 to drive the laser source and an analog-to-digital converter 43 to digitize the signal from the photodetection elements of the TDLAS optical system 44. The digital-to-analog converter 42 may provide the driving signal to a laser driver of the TDLAS optical system 44. The TDLAS optical system 44 may include elements such as those shown and described in FIGS. 1 and 2, and in particular, each of the TDLAS arrangements of FIGS. 2 (20a, 20b, 20c, and 20d) may be the TDLAS optical system 44. The output of the TDLAS optical system 44, which may be the optical detector signal(s) may be digitized by the analog-to-digital converter 43 and fringe spectral analysis and calibration 45 performed via peak identification of the in-line FPI or MZI spectrum, or a chirped sinusoidal regression model may be subsequently utilized for determination of a linearization transformation 46 as part of the fringe spectrum calibration process 47. The resulting transformation is applied to the measured analyte spectrum 48 using a LMS regression model 48 applicable to the line-shape of interest, which enables accurate quantification of the target analyte. This may be accomplished for example, using suitable computational devices. Such post-processing/spectral fitting algorithms present in 48 may include, for example, Voigt, Lorentz, Gaussian, Rautian, or Galatry line-shape profiles, in conjunction with conventional baseline subtraction and/or ratio, or any other dynamic baseline fitting-routine thereof. The combined spectrum is input to a LMS regression algorithm for residual minimization for accurate concentration retrieval.

Additionally, the fringe calibration output 47 from the in-line FPI or MZI or any other similarly equivalent manifestation of a fringe generating device may also be used as feedback into the generation of the driving signal to adaptively compensate for ramping non-linearities in real-time. Thus, the occurrence of non-linearities may be identified and quantified immediately by determination of a frequency linearization transformation 49 of the fringe spectrum, which may be applied directly to the driving signal of the laser. This allows an in-situ adjustment of the laser ramp to compensate for the non-linear ramping in real-time, as the reference and/or sample gas is analyzed (depending on the chosen embodiments depicted in FIG. 2).

Moreover, the real-time ramp compensation method described above may additionally include optional ramp compensation provided at a user-specified duty cycle in addition to real-time calibration using the in-line fringe reference. This may reduce calculation times during real-time analysis to maximize the measurement-to-calculation time ratio, without significantly sacrificing measurement accuracy. The key time interval relevant in this case is the temporal stability of the frequency non-linearity; calibration merely needs to occur within a tolerable "drift" interval, below which the TDLAS or LAS operator may not require more frequency calibration.

Figure 5:
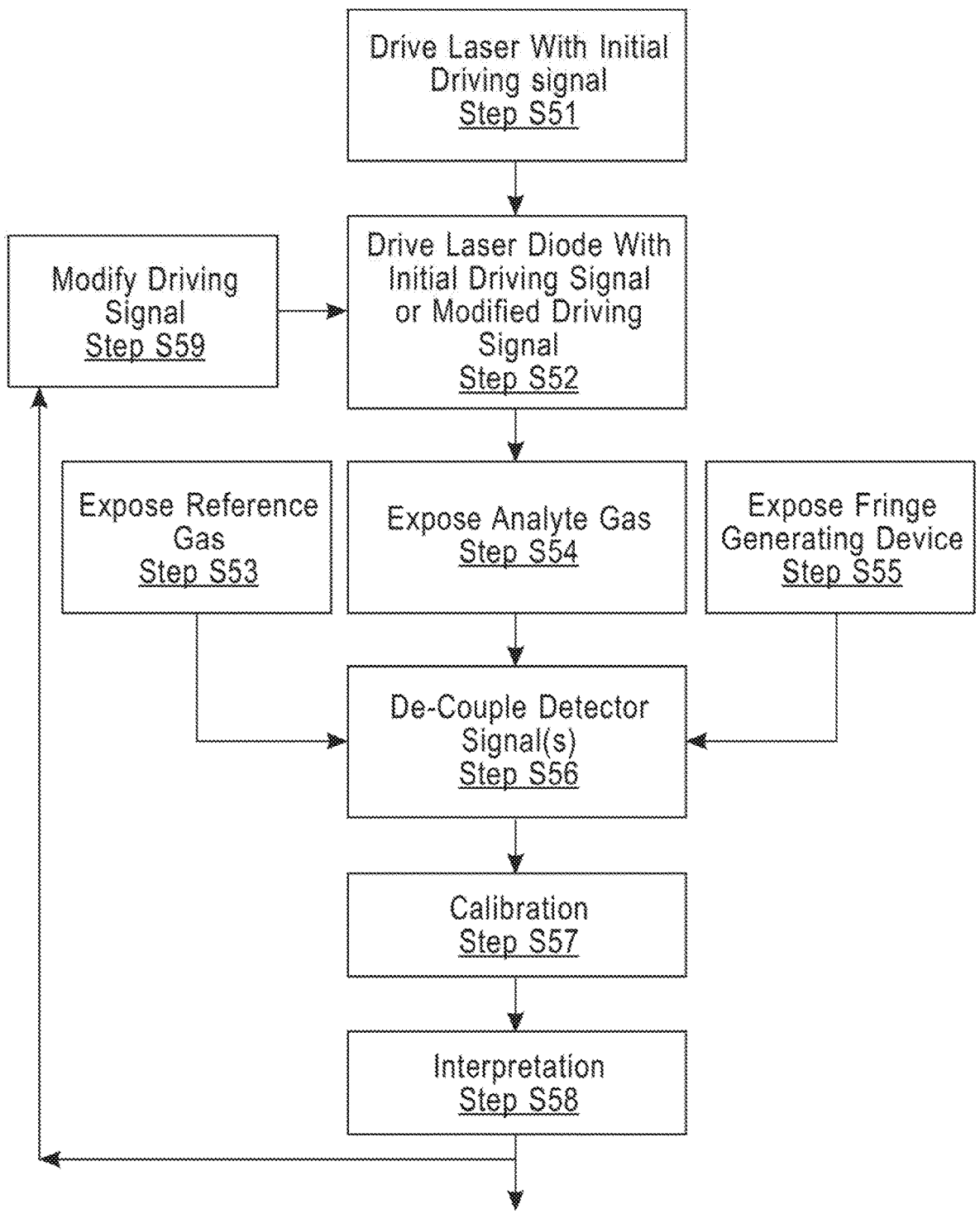
FIG. 5 is a flowchart illustrating a method for performing TDLAS in accordance with exemplary embodiments of the present invention.

FIG. 5 is a flowchart illustrating a method for performing TDLAS in accordance with exemplary embodiments of the present invention. First, an initial driving signal may be provided (Step S51). The initial driving signal may be a signal for driving the diode laser. As discussed above, the initial driving signal may have a soft ramp transition for mitigation of ramp nonlinearities and/or non-uniformities present in discontinuous ramp transitions and/or adjacent ramp segments. The initial driving signal may then power a laser driver that drives the laser diode (Step S52). The laser diode may provide a laser beam through a reference gas (Step S53), an analyte gas (Step S54), and a fringe generating device (Step S55), although the order in which this occurs and whether these steps occur as part of a single acquisition channel or whether the fringe generating device (Step S55) is exposed in series with the reference gas (Step S53) or analyte gas (Step S54) acquisition channels may be determined according to availability and need, in accordance with the embodiments outlined in FIG. 2.

Thereafter, detector signals may be received, and the fringe contribution may be decoupled therefrom (Step S56) due to the use of a physically long FPI or MZI, and the reference gas resulting spectrum may be used to calibrate the system (Step S57). The calibrated system may then be used to interpret the resulting analyte spectrum (Step S58) and feedback from the fringe contribution may be optionally used to modify the driving signal to remove ramping non-linearities and provide a modified driving signal therefrom (Step S59). Thereafter, the process may continue iteratively while driving the diode laser with the modified driving signal.

Figure 6:
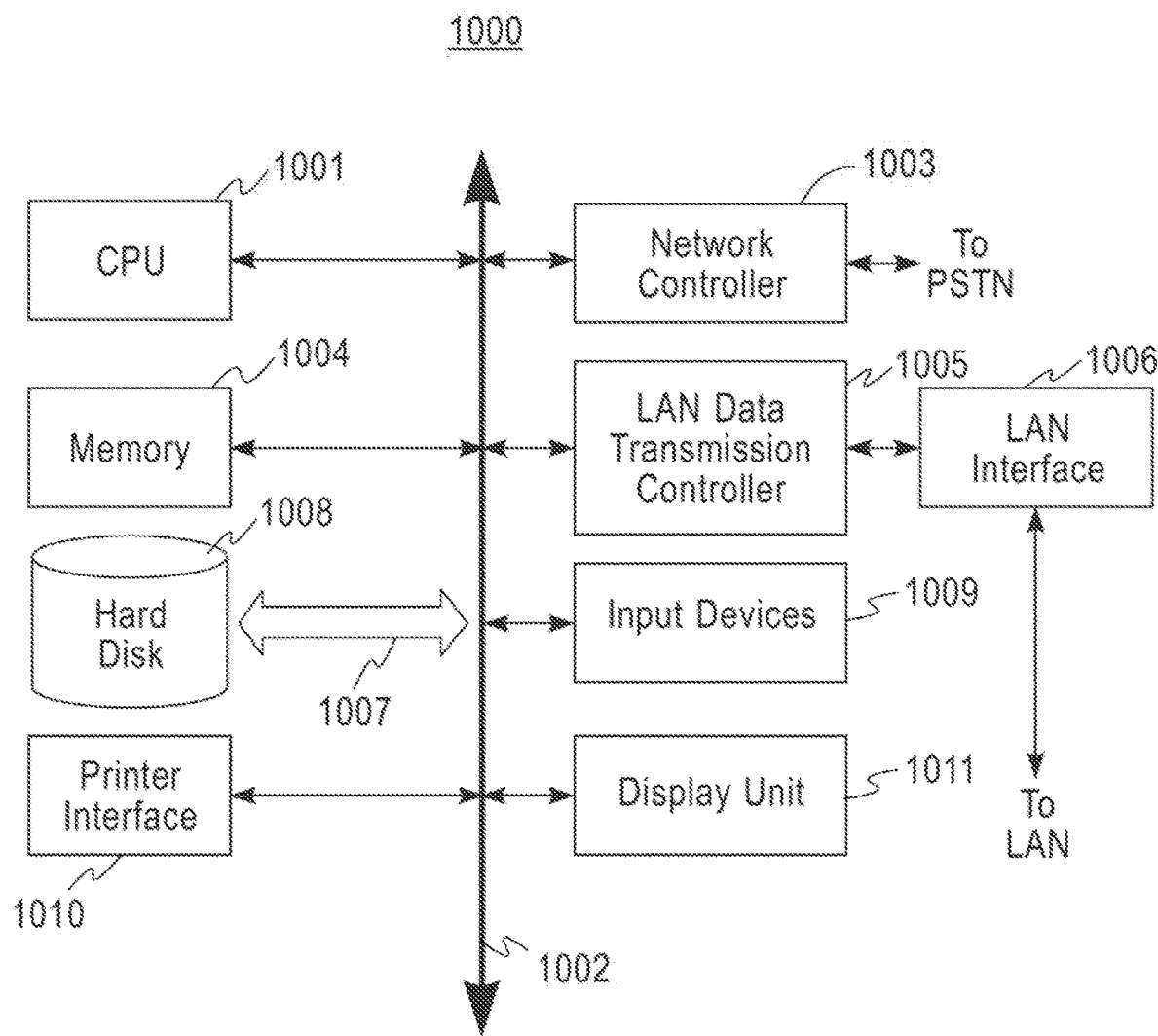
FIG. 6 shows an example of a computer system capable of implementing the method and apparatus according to embodiments of the present disclosure.

As discussed herein, the detection signals may be analyzed and interpreted using various computational devices. These computational devices may be embodied as digital signal processors or other forms of computer systems. Referring now to FIG. 6, such a computer system (referred to generally as system 1000) may include, for example, a processor e.g., central processing unit (CPU) 1001, memory 1004 such as a random access memory (RAM), a printer interface 1010, a display unit 1011, a local area network (LAN) data transmission controller 1005, which is operably coupled to a LAN interface 1006 which can be further coupled to a LAN, a network controller 1003 that may provide for communication with a Public Switched Telephone Network (PSTN), one or more input devices 1009, for example, a keyboard, mouse etc., and a bus 1002 for operably connecting various subsystems/components. As shown, the system 1000 may also be connected via a link 1007 to a non-volatile data store, for example, hard disk, 1008.

Exemplary embodiments described herein are illustrative, and many variations can be introduced without departing from the spirit of the invention or from the scope of the appended claims. For example, elements and/or features of different exemplary embodiments may be combined with each other and/or substituted for each other within the scope of this invention and appended claims.

What is claimed is:

1. A tunable diode laser absorption spectroscopy (TDLAS) device, comprising:
    a tunable diode laser configured to produce a laser beam;
    a laser driver configured to drive the tunable diode laser and ramp the laser beam within a particular frequency range of interest;
    an analyte gas container including an analyte gas of an unknown composition, the analyte gas container being configured to receive the laser beam from the tunable diode laser and pass the laser beam through the analyte gas container;
    a reference gas container including a reference gas, the reference gas container being configured to receive the laser beam from the tunable diode laser and pass the laser beam through the reference gas container;
    a fringe generating device configured to receive the laser beam from the analyte gas container and pass the laser beam through the fringe generating device;

a first optical detector configured to detect the laser beam after it has passed through the analyte gas container and the fringe generating device;

a second optical detector configured to detect the laser beam after it has passed through the reference gas container;

an acquisition card configured to sample an output of the first optical detector and the second optical detector; and a spectral analyzer configured to:

receive output data from the acquisition card;

determine a spectrum of the output data;

decouple a fringe spectrum attributable to the fringe generating device from the determined spectrum;

calibrate the spectrum based on an expected spectrum of both the fringe spectrum and the reference gas; and determine a composition of the analyte based on the spectrum.

2. The device of claim 1, wherein the fringe generating device is a Fabry-Perot interferometer with sufficiently long physical length to frequency decouple the fringe spectrum from the determined spectrum.

3. The device of claim 1, wherein the fringe generating device is a Mach-Zehnder interferometer with path length differential sufficiently long to frequency decouple the fringe spectrum from the determined spectrum.

4. The device of claim 1, wherein the spectral analyzer is configured to numerically decouple fringe spectrum from the determined spectrum such that a fringe spacing is used to re-linearize or calibrate the determined spectrum.

5. The device of claim 1, wherein the spectral analyzer is configured to use a real-time ramp compensation loop based on a nonlinearity determined from the fringe generating device.

6. The device of claim 1, wherein the analyte gas container is comprised of a material that is optically transparent within the particular frequency range of interest.

7. The device of claim 1, wherein the spectral analyzer is configured to determine a spectrum of the output data using a least-mean squares (LMS) regression algorithm which incorporates a spectral line-shape.

8. The device of claim 1, wherein the spectral analyzer is configured to perform background removal on the determined spectrum.

9. The device of claim 1, wherein the fringe generating device is a Fabry-Perot interferometer.

10. The device of claim 1, wherein the fringe generating device is a Mach-Zehnder interfometer.

11. The device of claim 1, wherein the fringe spectrum is intrinsic to the TDLAS system.

12. The device of claim 1, wherein the reference gas container is part of a first acquisition channel and the analyte gas container and the fringe generating device are part of a second acquisition channel.

13. The device of claim 1, wherein the reference gas container is part of a first acquisition channel and the analyte gas container is part of a second acquisition channel.

14. The device of claim 1, wherein the fringe generating device is a fiber-optic interferometer incorporating a first 99/1 beam splitter, a second 99/1 beam splitter, and a fiber length difference between splitter arms.

15. The device of claim 1, wherein the acquisition card includes an analog-to-digital converter for converting the output of the optical detector into digital data that is provided to the spectral analyzer.

16. The device of claim 13, wherein the acquisition card further includes a digital-to-analog converter for converting the digital data into analog data used as feedback to the laser driver.

17. A method for performing tunable diode laser absorption spectroscopy, comprising:

driving a tunable diode laser with an initial driving signal having soft transitions to produce a laser beam with a smooth laser frequency ramp;

splitting the laser beam into two paths;

passing the laser beam though a reference gas in a first path of the two paths;

passing the laser beam first through an analyte gas of an unknown composition and then through a fringe generating device in a second path of the two paths;

detecting the laser beam with a first optical detector after it has passed through the first path to produce a first detection signal;

detecting the laser beam with a second optical detector after it has passed through the second path to produce a second detection signal;

de-coupling a contribution of a fringe spectrum attributable to the fringe generating device from the first or second detection signal;

calibrating the first detection signal using a contribution of the reference gas; and interpreting the second detection signal, using the calibration of the first detection signal, to identify a composition of the analyte gas.

\* \* \* \* \*